United States Patent [19]
Ohmae et al.

[11] Patent Number: 6,017,999
[45] Date of Patent: *Jan. 25, 2000

[54] METHOD FOR PRODUCING IMPACT-RESISTANT POLYESTER RESIN COMPOSITIONS

[75] Inventors: Tadayuki Ohmae; Yoshiki Toyoshima; Kentaro Mashita; Noboru Yamaguchi; Kenzo Chikanari, all of Chiba, Japan

[73] Assignee: Sumitomo Chemical Company, Limited, Osaka, Japan

[ * ] Notice: This patent is subject to a terminal disclaimer.

[21] Appl. No.: 08/312,621

[22] Filed: Sep. 27, 1994

Related U.S. Application Data

[62] Division of application No. 08/156,942, Nov. 24, 1993, abandoned, which is a continuation of application No. 07/774,617, Oct. 10, 1991, abandoned.

[30] Foreign Application Priority Data

Oct. 12, 1990 [JP] Japan .................... 2-272281

[51] Int. Cl.$^7$ .............. C08L 33/14; C08L 67/02
[52] U.S. Cl. ............. 525/92 A; 525/166; 525/173; 525/175; 525/176
[58] Field of Search ................. 525/173, 175, 525/176, 166, 92 A

[56] References Cited

U.S. PATENT DOCUMENTS

| | | |
|---|---|---|
| 4,172,859 | 10/1979 | Epstein . |
| 4,956,501 | 9/1990 | Sunseri . |

FOREIGN PATENT DOCUMENTS

| | | |
|---|---|---|
| 237306 | 9/1987 | European Pat. Off. . |
| 285256 | 10/1988 | European Pat. Off. . |
| 46-32866 | 6/1971 | Japan . |
| 59-28223 | 7/1984 | Japan . |
| 61-501270 | 6/1986 | Japan . |
| 61-221260 | 10/1986 | Japan . |
| 62-61067 | 12/1987 | Japan . |
| 63-245428 | 10/1988 | Japan . |
| 1208585 | 5/1970 | United Kingdom . |
| 8905838 | 6/1989 | WIPO . |

*Primary Examiner*—Patricia A. Short
*Attorney, Agent, or Firm*—Pillsbury Madison & Sutro LLP

[57] ABSTRACT

A saturated polyester resin composition excellent in impact resistance is prepared by melt kneading (A) 30–58 parts by weight of a saturated polyester resin, (B) 42–70 parts by weight of an epoxy group-containing ethylene copolymer comprising (a) 50–99% by weight of ethylene unit, (b) 0.1–30% by weight of unsaturated carboxylic acid glycidyl ester unit or unsaturated glycidyl ether unit, and (c) 0–49% by weight of ethylenically unsaturated ester compound unit, (C) 0.01–20 parts by weight of a polyfunctional compound containing at least two specific functional groups of amino groups, carboxyl groups, carboxylic acid anhydride groups, hydroxyl groups or

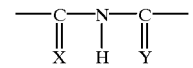

unit (wherein X and Y are both oxygen atoms or sulfur atoms or one of them is an oxygen atom and another is a sulfur atom) and (D) 0–30 parts by weight of a block copolyether ester elastomer, the amounts of (C) and (D) being based on 100 parts by weight of (A) plus (B), thereby to obtain a former-stage composition (I) and furthermore melt kneading the resulting composition (I) with (E) 50–1000 parts by weight of a saturated polyester resin and (F) 0–30 parts by weight of a block copolyether ester elastomer at a later-stage.

8 Claims, 2 Drawing Sheets

1μ

1μ

METHOD FOR PRODUCING IMPACT-RESISTANT POLYESTER RESIN COMPOSITIONS

This is a division of application Ser. No. 08/156,942, filed Nov. 24, 1993, now abandoned which is a FWC of 07/774,617, filed Oct. 10, 1991, now abandoned.

BACKGROUND OF THE INVENTION

1. Field of the Invention

The present invention relates to a method for producing a novel polyester resin composition which can be made into shaped articles, sheets, films, etc. by injection molding or extrusion molding and which has improved mechanical properties, especially improved impact resistance.

Description of Related Art

In general, saturated polyester resins represented by polyethylene terephthalate and polybutylene terephthalate are widely used as engineering plastics because of their excellent weather resistance, electrical characteristics, chemical resistance, abrasion resistance and heat aging resistance.

However, they have defects or problems to be solved in impact resistance of molded articles made therefrom and are restricted in their uses.

A lot of compositions have been proposed for improving the impact resistance which is defect of the saturated polyester resins.

A composition with ethylene-glycidyl methacrylate copolymer is proposed in JP-B-58-47419.

A composition with terpolymers such as ethylene-glycidyl methacrylate-methyl acrylate is proposed in JP-B-59-28223.

A composition with ethylene-glycidyl methacrylate copolymer is proposed in JP-B-62-61067.

A composition with ethylene-glycidyl methacrylate copolymer and carboxylic acid anhydride polyfunctional compound is proposed in JP-A-55-137154.

A composition with ethylene-glycidyl methacrylate copolymer and maleic anhydride grafted ethylene-propylene random copolymer is proposed in JP-A-61-221260.

A method of production which comprises melt kneading saturated polyester resin with epoxy group-containing ethylene copolymer and then melt kneading the composition with a polyfunctional compound is proposed in JP-A-61-245428.

However, according to the results of research by the inventors, it has been found that molded products relatively improved in impact resistance can be obtained by the above prior art, but the compositions are still not sufficient in balancing with flowability or processability and besides, are not satisfactory in balancing between rigidity and impact resistance.

SUMMARY AND OBJECTS OF THE INVENTION

The present invention aims at solving the above problems, namely, improving processability which is the problem in melt kneading of a saturated polyester resin, an epoxy group-containing ethylene copolymer and a polyfunctional compound.

The object of the present invention is to provide a method for producing a saturated polyester resin composition mainly composed of a saturated polyester resin which is excellent in mechanical properties such as impact resistance, heat resistance and rigidity and besides superior in processability.

FIG. 1 is a photograph of ×4500 which shows section of a molded product obtained from the composition of Example 1 which was observed under a transmittance type electron microscope. This photograph shows particle structure of epoxy group-containing ethylene copolymer, and FIG. 2 is a photograph of ×4500 which shows section of a molded product obtained from the composition of Comparative Example 1 which was observed under a transmittance type electron microscope. This photograph shows particle structure of epoxy group-containing ethylene copolymer.

DETAILED DESCRIPTION OF THE INVENTION

As result of intensive research conducted by the inventors on method for producing a resin composition effective for modification of saturated polyester resins, it has been found that a composition superior in processability and excellent in balancing of impact resistance, heat resistance and rigidity can be obtained by melt kneading an epoxy group-containing ethylene copolymer having a specific structure and a specific polyfunctional compound at a specific blending ratio. The present invention has been accomplished based thereon.

That is, the present invention relates to a method for producing a saturated polyester resin composition (II) excellent in impact resistance which comprises melt kneading a totally 100 parts by weight of a mixture of (A) 30–58 parts by weight of a saturated polyester resin and (B) 42–70 parts by weight of an epoxy group-containing ethylene copolymer comprising (a) 50–99% by weight of ethylene unit, (b) 0.1–30% by weight of unsaturated carboxylic acid glycidyl ester unit or unsaturated glycidyl ether unit, and (c) 0–49% by weight of ethylenically unsaturated ester compound unit with (C) 0.01–20 parts by weight of a polyfunctional compound containing at least two identical or different fuctional groups selected from amino group, carboxyl group, carboxylic acid anhydride group, hydroxyl group and

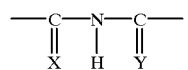

unit (wherein X and Y are both oxygen atoms or sulfur atoms or one of them is an oxygen atom and aother is a sulfur atom) and (D) 0–30 parts by weight of a block copolyether ester elastomer, thereby to obtain a former-stage composition (I) and furthermore melt kneading the resulting former composition with (E) 50–1000 parts by weight of a saturated polyester resin and (F) 0–30 parts by weight of a block copolyether ester elastomer at later-stage.

The saturated polyesters (A) and (E) used in the present invention comprise a dicarboxylic acid component at least 40 mol % of which is terephthalic acid and a diol component. As the dicarboxylic acid component other than terephthalic acid, mention may be made of one or mixtures of a aliphatic dicarboxylic acids of 2–20 carbon atoms such as adipic acid, sebacic acid and dodecanedicarboxylic acid, aromatic dicarboxylic acids such as isophthalic acid and naphthalene-dicarboxylic acid, alicyclic dicarboxylic acids such as cyclohexanedicarboxylic acid and mixtures thereof. As the diol component, mention may be made of one or mixtures of aliphatic glycols and alicyclic glycols such as ethylene glycol, 1,3-propanediol, 1,4-butanediol, 1,6-hexanediol, 1,10-decanediol and 1,4-cyclohexanediol.

Among these saturated polyester resins (A) and (E), especially polybutylene terephthalate and polyethylene terephthalate exhibit desirable effect of the present invention. Furthermore, these saturated polyester resins (A) and (E) preferably have an inherent viscosity of 0.5–3.0 dl/g measured at 25° C. using o-chlorophenol as a solvent. When saturated polyester resins (A) and (E) having an inherent viscosity outside the above range are used, the desired mechanical strength is somewhat inferior.

The epoxy group-containing ethylene copolymer (B) which is a constituting component of the impact-resistant polyester composition of the present invention is an epoxy group-containing ethylene copolymer which comprises (a) 50–99% by weight of ethylene unit, (b) 0.1–30% by weight, preferably 0.5–20% by weight of unsaturated carboxylic acid glycidyl ester unit, and (c) 0–49% by weight of ethylenically unsaturated ester compound unit.

The unsaturated carboxylic acid glycidyl ester unit and unsaturated glycidyl ether unit (b) in the epoxy group-containing ethylene copolymer (B) are represented by the following formulas (1) and (2).

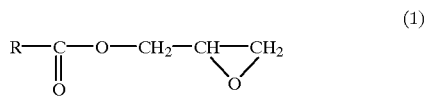
(1)

(R is a hydrocarbon group of 2–18 carbon atoms which has an ethylenically unsaturated bond.)

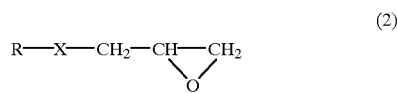
(2)

(R is a hydrocarbon group of 2–18 carbon atoms which has an ethylenically unsaturated bond and X is

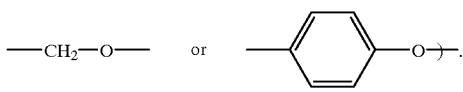

Examples are glycidyl acrylate, glycidyl methacrylate, glycidyl itaconate, allylglycidyl ether, 2-methylallylglycidyl ether, and styrene-p-glycidyl ether.

Furthermore, as the epoxy group-containing ethylene copolymer, there may be used ternary or higher copolymer comprising unsaturated carboxylic acid glycidyl ester or unsaturated glycidyl ether, ethylene and (c) ethylenically unsaturated ester compound. The ethylenically unsaturated compound (c) includes carboxylic acid vinyl esters such as vinyl acetate, vinyl propionate, methyl acrylate, ethyl acrylate, butyl acrylate, methyl methacrylate, ethyl methacrylate and butyl methacrylate and α, β-unsaturated carboxylic acid alkyl esters. Especially preferred are vinyl acetate, methyl acrylate and ethyl acrylate.

As examples of the epoxy group-containing ethylene copolymer (B), mention may be made of copolymers comprising ethylene unit and glycidyl methacrylate unit, copolymers comprising ethylene unit, glycidyl methacrylate unit and methyl acrylate unit, copolymers comprising ethylene unit, glycidyl methacrylate unit and ethyl acrylate unit, and copolymers of ethylene unit, glycidyl methacrylate unit and vinyl acetate unit.

Melt index (JIS K6760) of the epoxy group-containing ethylene copolymers is preferably 0.5–100 g/10 min, more preferably 2–50 g/10 min. The melt index may be outside this range, but if it is more than 100 g/10 min, the resulting composition is not preferred in mechanical properties and if it is less than 0.5 g/10 min, the copolymer is insufficient in compatibility with saturated polyester resin (A). Besides, flow processability of the resulting final composition (II) is inferior.

The epoxy group-containing ethylene copolymer is usually prepared by copolymerizing an unsaturated epoxy compound with ethylene in the presence of a radical former under 500–4000 atm at 100–300° C. in the presence or absence of suitable solvent or chain transfer agent. Alternatively, it can be also prepared by adding an unsaturated epoxy compound and a radical former to polyethylene and carrying out melt graft copolymerization thereof in an extruder.

The polyfunctional compound of the component (C) includes those which have in one molecule two or more identical or different functional groups selected from amino group, carboxyl group, carboxylic anhydride group, hydroxyl group, and

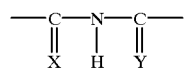

unit (wherein X and Y are both oxygen atoms or sulfur atoms or one of them is an oxygen atom and another is a sulfur atom).

The polyfunctional compound (C) has no limitation in its molecular weight and also includes polymer compounds.

Examples of the polyfunctional compound containing two or more amino groups in one molecule are shown below.

Aliphatic diamines such as 1,6-hexamethylenediamine, trimethylhexamethylenediamine, 1,4-diaminobutane, 1,3-diaminopropane, ethylene diamine and polyether diamine; aliphatic diamine carbamates such as hexamethylenediamine carbamate and ethylenediamine carbamate; aliphatic polyamines such as diethylenetriamine, triethylenetetramine, tetraethylenepentamine, pentaethylenehexamine, ethylaminoethylamine, methylaminopropylamine, 2-hydroxyethylaminopropylamine, aminoethylethanolamine, 1,3-bis(3-aminopropoxy)-2,2-dimethylpropane, 1,3,6-trisaminomethylhexane, iminobispropylamine, methyliminobispropylamine, and bis(hexamethylene) triamine; alicyclic polyamines such as menthenediamine, N-aminoethylpiperazine, 1,3-diaminocyclohexane, isophoronediamine, and bis(4-amino-3-methylcyclohexyl) methane; aliphatic polyamines having aromatic ring such as m-xylylenediamine and tetrachloro-p-xylylenediamine; aromatic amines such as m-phenylenediamine, diaminodiphenyl ether, 4,4'-methylenedianiline, diaminodiphenylsulfone, benzidine, 4,4'-bis (o-toluidine)-4,4'-thiodianiline, o-phenylenediamine, dianisidine, methylenebis(o-chloroaniline), 2,4-toluenediamine, bis(3,4-diaminophenyl) sulfone, diaminoditolysulfone, 4-chloro-o-phenylenediamine, 4-methoxy-6-methyl-m-phenylenediamine, and m-aminobenzylamine; and polyamines containing silicon such as 1,3-bis (γ-aminopropyl)-1,1,3,3-tetramethyldisiloxane.

Further examples are amine-modified silicone oil; butadieneacrylonitrile copolymer in which the terminal functional group is amine; tertiary amine compounds such as N,N,N',N'-tetramethylhexamethylene-diamine and N,N,N', N",N"-pentamethyldiethylenetriamine; ethylene copolymers comprising ethylene unit and a, β-unsaturated carboxylic acid N,N-dialkylaminoalkyl ester unit such as copolymer of ethylene and N,N-dimethylaminoethyl methacrylate; ethylene copolymers comprising ethylene unit and N,N-dialkylaminoalkyl a, B-unsaturated carboxylic acid amide unit such as copolymer of ethylene and N,N-dimethylaminopropylacrylamide; dihydrazide compounds such as succinic dihydrazide, adipic dihydrazide, isophthalic dihydrazide, and eicosanic diacid dihydrazide; diaminomaleonitrile; and melamine. Additional examples are compounds which are generally used also as curing agents for epoxy resins such as imidazoles such as 2,4,6-tris (dimethylaminomethyl) phenol and 2-ethylmethylimidazole.

Examples of the compound containing two or more carboxylic anhydride groups in one molecule include ethylene copolymers comprising ethylene unit and maleic anhydride unit, copolymers comprising isobutylene and maleic anhydride, and copolymers comprising styrene and maleic anhydride. These copolymers may additionally contain α, β-unsaturated carboxylic acid alkyl ester or carboxylic acid vinyl ester as a copolymer component. For example, they may contain as a copolymer component alkyl esters of acrylic acid or methacrylic acid such as methyl acrylate, ethyl acrylate, butyl acrylate, methyl methacrylate, ethyl methacrylate and butyl methacrylate, vinyl acetate, vinyl propionate, or the like. Moreover, mention may be made of trimellitic acid anhydride, pyromellitic acid anhydride, ethylene glycol bis(anhydrotrimellitate) and the like.

Examples of the compound containing two or more hydroxyl groups in one molecule include saponification product of copolymer of ethylene and vinyl acetate, cyanuric acid, phenol novolak resin, and o-cresol novolak resin.

Examples of the compound having two or more

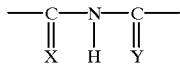

(wherein X and Y are both oxygen atoms or sulfur atoms or one of them is an oxygen atom and another is a sulfur atom) includes heterocyclic compounds, aromatic compounds and aliphatic compounds.

As examples of the heterocyclic compounds, mention may be made of parabanic acid, alloxan, alloxantin, alloxan-5-oxime, barbituric acid, 5,5-diethylbarbituric acid, 5-ethyl-5-phenylbarbituric acid, 5-(1-methylbutyl)-5-allylbarbituric acid, 5,5-diallylbarbituric acid, isocyanuric acid, and these compounds in which oxygen atom of

is substituted with a sulfur atom, such as 2,4-dithiobarbituric acid and 2-thiobarbituric acid.

Examples of the aromatic compounds are pyromellitic diimide, mellitic triimide, and 1,4,5,8-naphthalic diimide, and thioimides corresponding thereto.

Examples of the aliphatic compounds are triuret, 1-methyltriuret, 1,1-diethyltriuret, tetrauret and thiourets corresponding thereto.

Examples of the compounds having two or more carboxyl groups in one molecule of the polyfunctional compound (C) are aliphatic polycarboxylic acids such as oxalic acid, succinic acid, adipic acid, azelaic acid, sebacic acid, dodecanedicarboxylic acid, carbarylic acid, cyclohexanedicarboxylic acid, and cyclopentanedicarboxylic acid; polymeric polycarboxylic acids such as ethylene-acrylic acid copolymer, ethylene-methacrylic acid, ethylene-acrylic acid-methyl acrylate copolymer, ethylene-acrylic acid-ethyl acrylate copolymer, ethylene-acrylic acid-butyl acrylate copolymer, ethylene-acrylic acid-vinyl acetate copolymer, ethylene-methcacrylic acid-methyl methacrylate copolymer, ethylene-methacrylic acid-ethyl methacrylate copolymer, ethylene-methacrylic acid-butyl methacrylate copolymer, and ethylene-methacrylic acid-vinyl acetate copolymer; and aromatic polyvalent carboxylic acids such as terephthalic acid, isophthalic acid, o-phthalic acid, naphthalenedicarboxylic acid, biphenyldicarboxylic acid, trimesic acid, and trimellitic acid. Among them, aliphatic polyvalent carboxylic acids and polymeric polyvalent carboxylic acids are especially preferred.

Furthermore, as the polyfunctional compounds (C) there are included those which have at least one carboxyl group and at least one functional group selected from amino group, carboxylic anhydride group, hydroxyl group and

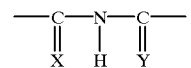

unit (wherein X and Y are as defined above) in one molecule.

Examples of these compounds are 4-aminobutyric acid, 6-aminohexanoic acid, 12-aminododecanoic acid, 4-hydroxybutyric acid, 6-hydroxyhexanoic acid, 12-hydroxydodecanoic acid, 5-hydroxybarbituric acid, 5-aminobarbituric acid and 5-hydroxyiminobarbituric acid.

These polyfunctional compounds all may be used in combination.

The polyfunctional compounds (C) of the present invention must be those which react with epoxy group of the epoxy group-containing ethylene copolymers (B) to act as a partial crosslinking agent. That is, when saturated polyester resin (A) and epoxy group-containing ethylene copolymer (B) are melt kneaded, a morphology which comprises the epoxy group-containing ethylene copolymer (B) in which saturated polyester resin (A) particles are dispersed is firstly produced owing to also the fact that melting point of epoxy group-containing ethylene copolymer (B) is lower than saturated polyester resin (A). Thereafter, polyfunctional compound (C) reacts with the epoxy group of epoxy group-containing ethylene copolymer (B) and acts as a partial crosslinking agent to cause increase in melt viscosity of the epoxy group-containing ethylene copolymer-(B) phase. As a result, phase inversion occurs to produce a multiple dispersion state in which epoxy group-containing ethylene copolymer (B) phase containing saturated polyester resin (A) particles therein is dispersed in saturated polyester resin (A) matrix phase. This dispersion state resembles that of impact-resistant polystyrene and forms morphology of so-called salami structure or subinclusion structure and this is considered to be a dispersion state which generates the best properties.

It is sometimes preferred to use a reaction accelerator in order to accelerate the reaction of polyfunctional compound (C) with epoxy group-containing ethylene copolymer (B). A compound selected from quaternary ammonium salts, quaternary phosphonium salts and phosphines can be used as the reaction accelerator. It is preferred to use the reaction accelerator especially when a compound having carboxyl group or

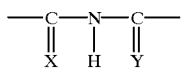

unit is used as the polyfunctional compound.

Examples of the quaternary ammonium salts are tetrabutylammonium bromide, n-dodecyltrimethylammonium bromide, and octadecyltrimethylammonium bromide. Examples of the quaternary phosphonium salts are triphenylbenzylphosphonium chloride, triphenylbenzylphosphonium iodide and tetrabutylphosphonium bromide. Examples of the phosphines are triphenylphosphine and tri-2,6-dimethoxyphenylphosphine.

Amount of the reaction accelerator is 0–5 parts by weight. Even if it is used in an amount of more than 5 parts by weight, the effect obtained by increase of the amount cannot be expected.

The block copolyether ester elastomers of components (D) and (F) are respectively block copolymers of a high-melting point hard segment mainly composed of alkylene terephthalate unit and a low-melting point soft segment comprising aliphatic polyether.

The high-melting point hard segments mainly composed of alkylene terephthalate unit include those which are mainly composed of unit comprising terephthalic acid or dimethyl ester thereof and an alkylene glycol such as ethylene glycol, propylene glycol, tetramethylene glycol, pentamethylene glycol, or hexamethylene glycol. In some cases, they may contain as component a small amount of aromatic, alicyclic or aliphatic dicarboxylic acids such as isophthalic acid, naphthalenedicarboxylic acid, 1,4-cyclohexanedicarboxylic acid, adipic acid and sebacic acid as dicarboxylic acid and glycols such as p-xylylene glycol and cyclohexane dimethanol.

As poly(alkyleneoxide) glycols which constitute the low-melting point soft segments comprising aliphatic polyethers as another component of the block copolyether ester elastomers, mention may be made of single glycols such as poly(ethylene oxide) glycol, poly(propylene oxide) glycol, and poly(tetramethylene oxide) glycol, copolyglycols such as polyglycols of random or block copolymers of ethylene oxide and propylene oxide and polyglycols of random or block copolymers or tetrahydrofuran and 2,2-dimethyloxetane, and mixtures of these glycols.

Number-average molecular weight of the poly (alkylene oxide) glycol is 400–6000. If it is more than 6000, the poly(alkylene oxide) glycol unit per se is crystalline and does not contribute to improvement of impact resistance and if it is less than 400, it does not contribute to improvement of impact resistance.

The poly(alkylene oxide) glycol component is usually contained in an amount of 10–80% by weight in the block copolyether ester elastomer. If the content is more than 80% by weight, properties of the hard segment of the elastomer almost disappear to cause deterioration of compatibility with polyethylene terephthalate type polyesters or polybutylene terephthalate type polyesters. If the content is less than 10% by weight, compatibility with epoxy group-containing ethylene copolymers is inferior because amount of the poly (alkylene oxide) glycol unit is small and thus, it does not contribute to improvement of impact resistance.

Preferred examples of the block copolyether ester elastomers (D) and (F) are the elastomers in which at least 60 mol % of the alkylene terephthalate unit of the hard segment component comprises polybutylene terephthalate unit and the aliphatic polyether of the soft segment component is poly (tetramethylene oxide) glycol.

The block copolyether ester elastomers (D) and (F) of the present invention can be prepared by known processes mentioned, for example, in JP-B-60-16454. They include a process of direct esterification of terephthalic acid, a low-molecular weight diol and a poly(alkylene oxide) glycol and a process of ester exchanging a dialkyl terephthalate and a low-molecular weight diol, followed by adding a poly (alkylene oxide) glycol to carry out polycondensation. If necessary, catalysts for acceleration of the reactions, various stabilizers, modifiers, pigments and the like can be used for preparation of the elastomers.

These block copolyether ester elastomers are widely industrially produced and an example is one which is sold in the name of Pelprene by Toyobo Co., Ltd.

The impact-resistant polyester resin composition (I) produced by melt kneading in the pre-stage in the present invention contain 30–58 parts by weight of polyester resin (A) and 42–70 parts by weight of epoxy group-containing ethylene copolymer (B). In more preferred composition are contained 35–58 parts by weight of saturated polyester resin (A) and 42–65 parts by weight of epoxy group-containing ethylene copolymer (B). If content of saturated polyester resin is less than 30 parts by weight, composition of the desired structure cannot be obtained and the composition is insufficient in heat resistance and oil resistance. If it is more than 58 parts by weight, the composition is inferior in rigidity and low-temperature resistances, especially low-temperature impact resistance and flexibility.

Addition amount of polyfunctional compound (C) is 0.01–20 parts by weight based on totally 100 parts by weight of saturated polyester resin (A) and epoxy group-containing ethylen copolymer (B). If it is less than 0.01 part by weight, the effect to improve mechanical properties such as impact resistance is not satisfactory and if it is more than 20 parts by weight, no further effect is obtained.

Amount of saturated polyester resin (E) added in the later-stage in the present invention is 50–1000 parts by weight based on totally 100 parts by weight of (A) and (B). If it is less than 50 parts by weight, rigidity and heat resistance are not sufficient and if it is more than 1000 parts by weight, impact resistance is not satisfactory.

The object of the present invention can be attained without the block copolyether ester elastomers of components (D) and (F), but it is preferred to add them in an amount of 30 parts by weight or less based on totally 100 parts by weight of components (A) and (B). If they are added in the amount of more than 30 parts by weight, no further effect is obtained.

Method for producing the composition of the present invention comprises kneading the components in molten state. Saturated polyester resin (A), epoxy group-containing ethylene copolymer (B) and polyfunctional compound (C) and, if necessary, block copolyether ester elastomer (D) were melt kneaded to obtain former-stage composition (I). This composition (I) was melt kneaded with saturated polyester resin (E) and, if necessary, block copolyether ester elastomer (F) in the later-stage to produce saturated polyester resin composition (II).

The former-stage composition (I) can be prepared by melt kneading simultaneously saturated polyester resin (A), epoxy group-containing ethylene copolymer (B), polyfunctional compound (C) and block copolyether ester elastomer (D), but it is preferably prepared by melt kneading saturated polyester resin (A), epoxy group-containing ethylene copolymer (B) and a reaction accelerator and thereafter, melt kneading the resulting composition with polyfunctional compound (C) and if necessary, block copolyether ester elastomer (D). This is because the reaction product of saturated polyester resin (A) and epoxy group-containing ethylene copolymer (B) which acts as a compatibilizing agent between (A) and (B) is produced in a larger amount in the latter process than in the former process.

The polyester resin composition (II) of the present invention can provide molded products excellent in balancing of properties such as mechanical properties, for example, impact resistance and thermal properties. Moreover, the composition is superior in processability to impact-resistant polyester compositions produced by conventional simple kneading method. Especially, rigidity is enhanced, flowability represented by spiral flow value is increased and processability is improved by adding saturated polyester (E) and kneading it with the former-stage composition in the later-stage.

The reason for conspicuously advantageous effect to improve properties being able to be obtained by melt kneading the components by the above-mentioned specific blending method is considered that micro-dispersion state of polymers having good properties is produced by proper crosslinking action. That is, a multiple dispersion state is formed in which epoxy group-containing ethylene copolymer phase containing saturated polyester resin particles is dispersed in saturated polyester resin matrix and this dispersion state resembles that of impact-resistant polystyrene and forms morphology of so-called salami structure or subinclusion structure. This is a dispersion state which produces the most preferred properties.

Form and size of the epoxy group-containing ethylene copolymer phase are essentially not limited and rather the better properties are obtained in the case of a few micron in average size. In this sense, this can be said to be novel technical idea which can be clearly distinguished from idea of prior art according to which the improvement effect increases with particle size of rubber-like dispersion phase such as ethylene copolymer component becoming finer, for example, less than 1 micron (JP-B-59-28223).

It is considered that properties such as impact resistance can be further improved for the following reasons by addition of block copolyether ester elastomers (D) and (F).

The high-melting point hard segment mainly composed of alkylene terephthalate unit has good compatibility with saturated polyesters (A) and (E). On the other hand, the low-melting point soft segment comprising aliphatic polyether has good compatibility with epoxy group-containing ethylene copolymer (B). As a result, block copolyether ester elastomers (D) and (F) exist in the form of a membrane at interface between epoxy group-containing ethylene copolymer (B) particles and saturated polyesters (A) and (E) matrix, resulting in a flexible strong bond between the particles and the matrix. This has been confirmed by observing the morphology of the composition under a microscope (FIG. 1).

For melt kneading of the components, there may be used kneading apparatuses generally employed such as single or twin-screw extruders and other extruders, Banbury mixer, rolls, and various kneaders.

For the former-stage composition (I) obtained by adding polyfunctional compound (C) and block copolyether ester elastomer (D) (hereinafter referred to as "elastomer (D)") to components (A) and (B) and melt kneading them, it can be produced by once granulating the composition obtained by melt kneading saturated polyester resin (A) and epoxy group-containing ethylene copolymer (B) by, for example, in an extruder, then, adding thereto polyfunctional compound (C) and elastomer (D) and again melt kneading them in an extruder. However, preferably, using an extruder with a side feeder, a melt kneaded composition of saturated polyester resin (A) and epoxy group-containing ethylene copolymer (B) is produced in the front portion (feeding side) of the extruder and polyfunctional compound (C) and elastomer (D) in solid state, molten state or liquid state are fed from the side feeder in the rear portion (discharging side) of the same extruder and melt kneaded with the composition of (A) and (B).

Furthermore, it is also a preferred method to previously prepare a master batch by melt kneading polyfunctional compound (C) with a resin inert to the polyfunctional compound (C) and feed it in a suitable amount at the time of preparing the impact-resistant polyester resin composition of the present invention. Elastomer (D) can be used as the inert resin.

The saturated polyester resin composition (II) of the present invention can be produced by once granulating the former-stage composition (I), then adding saturated polyester resin (E) and again carrying out melt kneading in an extruder, but preferably it is produced by producing the former-stage composition (I) in the front portion of an extruder having a side feeder and feeding and melt kneading saturated polyester resin (E) in molten state or solid state from the side feeder in the rear portion of the same extruder.

Before kneading, it is preferable to uniformly mix respective resin components in the form of powder or pellets in a tumbler or a Henschel mixer. However, each resin may be separately fed directly to a kneading apparatus through a metering device without mixing.

The impact-resistant polyester resin composition (II) of the present invention may further contain other components, for example, additives such as pigment, dye, reinforcing agent, filler, heat stabilizer, antioxidant, weathering agent, nucleating agent, anti-static agent, flame retardant, and plasticizer or other polymers as far as processability and properties of the composition are not damaged. Especially when reinforcing agents or fillers such as glass fibers subjected to various surface treatments, carbon fibers, talc, calcium carbonate and magnesium hydroxide are added to the impact-resistant polyester resin composition of the present invention, extremely useful materials superior in balance between impact resistance and bending rigidity can be obtained.

The impact-resistant polyester resin composition (II) of the present invention is molded by various methods such as injection molding, extrusion molding and the like.

EXAMPLE

The present invention will be illustrated by the following nonlimiting examples.

1. Starting Materials

In examples and comparative examples, the following were used as saturated polyester resins (A) and (E), epoxy group-containing ethylene copolymer (B), polyfunctional compound (C), block copolyether ester elastomers (D) and (F) (hereinafter referred to as "elastomer"), and reaction accelerator (R).

(A), (E) Saturated polyester resins
① Polybutylene terephthalate (PBT)
DURANEX 200FP (manufactured by Polyplastic Co.) IV=0.6 dl/g
TUFPET PBT N1000 (manufactured by Mitsubishi Rayon Co., Ltd.) IV=1.0 dl/g ② Polyethylene terephthalate (PET)
SA 1203 (manufactured by Unitika Ltd.) IV=0.7 dl/g
RECYCLE-PET (manufactured by FUJITECH Inc.) IV=0.6 dl/g
(B) Epoxy group-containing ethylene copolymers
① Copolymer (1)
E/GMA/MA=60/7/33% by weight
MI=33 g/10 min (190° C., 2160 g)
② Copolymer (2)
E/GMA/EA=63/6/31% by weight
MI=7 g/10 min (190° C., 2160 g)
③ Copolymer (3)
E/GMA/MA=69/3/28% by weight
MI=4 g/10 min (190° C., 2160 g)
④ Copolymer (4)
E/GMA=94/6% by weight
MI=3 g/10 min (190° C., 2160 g)
⑤ Copolymer (5)
E/GMA/MA=50/3/47% by weight
MI=9 g/10 min (190° C., 2160 g)
(C) Polyfunctional compounds
① Isocyanuric acid
② E/AA copolymer
Copolymer prepared by high-pressure radical copolymerization method
E/AA=80/20% by weight
MI=250 g/10 min (190° C., 2160 g)
③ Adipic acid
④ Hexamethylenediamine carbamate
(D), (F) Block copolyether ester elastomers
PELPRENE P-70B (polyteramethylene glycol polybutylene terephthalate block copolymer, MI=20 g/10 min (230° C., 2160 g) manufactured by Toyobo Co., Ltd.)
(R) Reaction accelerator
① ODA (Octadecyltrimethylammonium bromide)
Abbreviations in the above have the following meanings:
E: Ethylene, GMA: Glycidyl methacrylate,
MA: Methyl acrylate, MAH: Maleic anhydride,
EA: Ethyl acrylate, AA: Acrylic acid, MI:
Melt index, IV: Inherent viscosity 2. Method of Melt Kneading Temperature set for extruder was 260° C. in the case of using polybutylene terephthalate as a starting material and 270° C. in the case of using polyethylene terephthalate including use it in combination with polybutylene terephthalate.

1) Steps of melt kneading:

Melt kneading was carried out in the order as shown in Table 1. Details of kneading steps indicated by abbreviation are explained below.

A and E mean saturated polyester resins, B means epoxy group-containing ethylene copolymer, C means polyfunctional compound, D and F mean block copolyether ester elastomers, and R means reaction accelerator.

(–), [–] and <–> mean melt kenading. ○ means "the same as above".

<[(A+B+R)+(C+D)]+E> means melt kneading a melt kneaded composition of A, B and R with a melt kneaded composition of C and D and then melt kenading E therewith.

[(A+B+R+C+D)+E] means melt kneading a melt kneaded composition of A, B, R, C and D with E.

<[(A+B+R+C)+D]+E> means melt kneading a melt kneaded composition of A, B, R and C with D and then further melt kneading E therewith.

<[(A+B+R)+C+D]+E> means melt kneading a melt kneaded composition of A, B and R with C and D and then further melt kneading E therewith.

[(A+B+R+C)+E+F] means melt kneading a melt kneaded composition of A, B, R and C with E and F.

[(A+B+R+C)+E] means melt kneading a melt kneaded composition of A, B, R and C with E.

(A+B+R+C+D+E) means simultaneously melt kneading A, B, R, C, D and E.

(A+B+R+C+E) means simultaneously melt kneading A, B, R, C and E.

<[(A+B)+(C+D)]+E> means melt kneading a melt kneaded composition of A and B with a melt kneaded composition of C and D and then further melt kneading E therewith.

[(A+B+R+E)+(C+D)] means melt kneading a melt kneaded composition of A, B, R and E with a melt kneaded composition of C and D.

<[(A+B)+D]+E> means melt kneading a melt kneaded composition of A and B with D and then further melt kneading E therewith.

(B+E) means melt kneading B with E.

[(A+R+C+D)+E] means melt kneading a melt kneaded composition of A, R, C and D with E.

[(B+R+C+D)+E] means melt kneading a melt kneaded composition of B, R, C and D with E.

2) Method for preparing a master batch of polyfunctional compound (C):

(C–D) was carried out in the following manner.

Polyfunctional compound (C) and elastomer (D) shown in Table 1 were melt kneaded using a vented 30 mmø single screw extruder at 200° C. to prepare a master batch.

3) Method for producing impact-resistant polyester resin composition:

Examples

① Multi-stage melt kneading method (1):
<[(A+B+R)+(C+D)]+E> (Examples 1 and 7–14)
<[(A+B+R+C)+D]+E> (Example 3)
<[(A+B+R)+C+D]+E> (Example 15)
<[(A+B)+(C+D)]+E> (Examples 16 and 17)

A vented 30 mmø twin screw extruder with a side feeder (TEX 30 manufactured by Japan Steel Works, Ltd., L/D=40) was used. While melt kneading saturated polyester resin (A) and epoxy group-containing ethylene copolymer (B) and if necessary, reaction accelerator (R) and polyfunctional compound (C) which are shown in Table 1, a master batch of the polyfunctional compound (C) or respective components were continuously fed by the side feeder provided in the middle of extruder barrel through a metering device and melt kneaded with the above melt kneaded composition to obtain the former-stage composition (I).

The composition (I) was melt kneaded with saturated polyester resin (E) shown in Table 1 to obtain the impact-resistant polyester resin composition.

② Multi-stage melt kneading method (2):
[(A+B+R+C+D)+E] (Examples 2 and 6)
[(A+B+R+C)+E+F] (Example 4)
[(A+B+R+C)+E] (Example 5)

A vented 30 mmø twin screw extruder with a side feeder (TEX 30 manufactured by Japan Steel Works, Ltd., L/D=40) was used. While melt kneading saturated polyester resin (A), epoxy group-containing ethylene copolymer (B), reaction accelerator (R) and polyfunctional compound (C) and if necessary, elastomer (D) which were fed from a main feed opening, saturated polyester (E) and if necessary, elastomer (F) were fed by a side feeder provided in the middle of barrel to obtain the impact-resistant polyester resin composition.

③ Injection blending:
<[(A+B+R)+(C+D)]+E> (Example 18)

A test piece for measurement of properties was prepared using a pelletized blend of the former-stage composition (I) of the above ① and saturated polyester resin (E) as starting materials by 10 ounce injection molding machine (Toshiba IS-150-V) at a cylinder temperatuer of 260° C. and a mold temperature of 70° C.

④ One-stage melt kneading method:
<[(A+B+R)+(C+D)]+E> (Example 19)

A vented 100 mmø twin screw extruder provided with two side feeders (TEM 100 manufactured by Toshiba Machine Co., Ltd., L/D=38) was used as a melt kneading apparatus. Side feeders F1 and F2 were provided at positions at which the barrel was divided into three equal parts and vent was provided on extruder die side.

Using this extruder, saturated polyester resin (A) PBT, epoxy group-containing ethylene copolymer (B) and reaction accelerator (R) shown in Table 1 were fed from a main feed opening, then the master batch of impact-resistant functional compound (C) was fed from side feeder F1, and furthermore, saturated polyester resin (E) PBT was fed from side feeder F2 to carry out melt kneading of them, thereby to obtain the impact-resistant polyester resin composition.

4) Method for preparation of comparative compostiotons:
① Comparative Examples 1–6
(A+B+R+C+D+E) (Comparative Examples 1, 3–6)
(A+B+R+C+E) (Comparative Example 2)

Using the same vented 30 mmø twin screw extruder as used in Example 1, saturated polyester resin (A), epoxy group-containing ethylene copolymer (B), reaction accelerator (R), polyfunctional compound (C), saturated polyester resin (E) and if necessary, elastomer (D) were simultaneously fed from a main feed opening and melt kneaded to obtain comparative compositions.

② Comparative Example 7
[(A+B+R+E)+(C+D)]

Using the same vented 30 mmø twin screw extruder as used in Example 1, while melt kneading saturated polyester resin (A), epoxy group-containing ethylene copolymer (B), reaction accelerator (R) and saturated polyester resin (E) shown in Table 1 which were fed from a main feed opening, a master batch of polyfunctional compound (C) and elastomer (D) was fed from side feeder provided in the middle of barrel and melt kneaded to obtain comparative composition.

③ Comparative Examples 8 and 9
<[(A+B)+D]+E>

Using the same vented 30 mmø twin screw extruder as used in Example 1, while melt kneading saturated polyester resin (A) and epoxy group-containing ethylene copolymer (B) shown in Table 1, elastomer (D) was continuously fed from side feeder provided in the middle of the barrel through a metering device to carry out melt kneading to obtain a composition.

Using the above twin screw extruder, the above obtained composition was melt kneaded with saturated polyester resin (E) PBT shown in Table 1 to obtain comparative compositions.

④ Comparative Examples 10 and 11
(B+E)

Using the same vented 30 mmø twin screw extruder as used in Example 1, epoxy group-containing ethylene copolymer (B) and saturated polyester resin (E) shown in Table 1 were fed from main feed opening and melt kneaded to obtain comparative compositions.

⑤ Comparative Example 12
[(A+R+C+D)+E]

Using the same vented 30 mmø twin screw extruder as used in Example 1, while melt kneading saturated polyester resin (A), reaction accelerator (R), polyfunctional compound (C) and elastomer (D) shown in Table 1 which were fed from a main feed opening, saturated polyester resin (E) was fed from side feeder provided in the middle of barrel and melt kneaded to obtain comparative composition.

⑥ Comparative Example 13
[(B+R+C+D)+E]

Using the same vented 30 mmø twin screw extruder as used in Example 1, while melt kneading epoxy group-containing ethylene copolymer (B), reaction accelerator (R), polyfunctional compound (C) and elastomer (D) shown in Table 1 which were fed from a main feed opening, saturated polyester resin (E) was fed from side feeder provided in the middle of barrel and melt kneaded to obtain comparative composition.

3. Measurement of Properties

Test pieces for measurement of properties were prepared for the impact-resistant polyester resin compositions obtained above by drying the compositions at 120° C. for 3 hours and then carrying out injection molding by a 10 ounce injection molding machine (Toshiba IS-150-V) at a cylinder temperature of 260° C. and a mold temperature of 70° C. for polybutylene terephthalate composition and at a cylinder temperature of 280° C. or a mold temperature of 120° C. for polyethylene terephthalate composition.

The starting saturated polyester resin was also similarly molded to prepare test pieces for measurement of properties.

Measurement of the properties in the examples and comparative examples was conducted by the following methods.

Flexural modulus was measured in accordance with JIS K7203 (sample thickness: 3.2 mm).

Tensile yield strength and elongation at rupture were measured in accordance with JIS K6301 (sample thickness: 2 mm)

Izod impact strength (sample thickness: 3.2 mm with V notch, measuring temperature: 23° C. and −30° C.) was measured in accordance with JIS K7110.

FWI (falling weight impact strength) was measured in accordance with JIS K7207 (−30° C., load: 5 kg, sample thickness: 3 mm).

HDT (heat distortion temperature) was measured in accordance with JIS K7207 (sample thickness: 3.2 mm, flexure stress: 4.6 kgf/cm$^2$).

Spiral flow test was conducted by carrying out injection molding by an ellipsoidal spiral mold of width 10 mm×depth 2 mm at a mold temperature of 70° C. and an injection pressure of 1200 kgf/cm$^2$ and measuring the flow length.

4. Results of Measurement

Results of measurement of properties in Examples and Comparative Examples are shown in Table 1. In Comparative Examples 14 and 15, results of measurement of properties of the starting saturated polyester resin are shown.

By employing the method of the present invention, impact-resistant polyester composition improved in processability and superior in properties can be obtained.

TABLE 1

| | Composition (part by weight) | | | | | | |
|---|---|---|---|---|---|---|---|
| No. | (A) Saturated polyester | (B) Copolymer | (R) Reaction accelerator | (C) Polyfunctional compound | (D) Elastomer | (E) Satruated polyester | (F) Elastomer |
| Example 1 | 200FP 50 | Copolymer (1) 50 | ODA 0.1 | Isocyanuric acid 0.5 | P-70B 9.5 | N1000 223 | None |
| Example 2 | ↑ | ↑ | ↑ | ↑ | ↑ | ↑ | None |
| Example 3 | ↑ | ↑ | ↑ | ↑ | ↑ | ↑ | None |
| Example 4 | ↑ | ↑ | ↑ | ↑ | None | ↑ | P-70B 9.5 |
| Comparative Example 1 | ↑ | ↑ | ↑ | ↑ | P-70B 9.5 | ↑ | None |
| Example 5 | ↑ | ↑ | ↑ | ↑ | None | N1000 233 | None |
| Comparative Example 2 | ↑ | ↑ | ↑ | ↑ | None | ↑ | None |
| Example 6 | RCPO1 50 | ↑ | ↑ | ↑ | P-70B 9.5 | N1000 223 | None |
| Example 7 | ↑ | ↑ | ↑ | ↑ | ↑ | ↑ | None |
| Comparative Example 3 | ↑ | ↑ | ↑ | ↑ | ↑ | ↑ | None |
| Example 8 | ↑ | ↑ | ↑ | ↑ | ↑ | SA1203 223 | None |
| Comparative Example 4 | RCPO1 50 | Copolymer (1) 50 | ODA 0.1 | Isocyanuric acid 0.5 | P-70B 9.5 | SA1203 223 | |
| Example 9 | 200FP 50 | ↑ | ↑ | ↑ | ↑ | N1000 400 | |
| Comparative Example 5 | ↑ | ↑ | ↑ | ↑ | ↑ | ↑ | |
| Example 10 | ↑ | ↑ | ↑ | ↑ | ↑ | N1000 150 | |
| Comparative Example 6 | ↑ | ↑ | ↑ | ↑ | ↑ | ↑ | |
| Example 11 | ↑ | Copolymer (2) 50 | ↑ | ↑ | ↑ | N1000 233 | |
| Example 12 | ↑ | Copolymer (3) 50 | ↑ | ↑ | ↑ | ↑ | |
| Example 13 | ↑ | Copolymer (4) 50 | ↑ | ↑ | ↑ | ↑ | |
| Example 14 | Copolymer | ↑ (5) 50 | ↑ | ↑ | ↑ | | |
| Example 15 | 200FP 50 | Copolymer (1) 50 | None | EAA 5 | P-70B 5 | N1000 223 | |
| Example 16 | ↑ | ↑ | None | Adipic acid 0.5 | P-70B 9.5 | ↑ | |
| Example 17 | ↑ | ↑ | None | Hexamethylenediamine carbamate 0.5 | P-70B 7.5 | ↑ | |
| Example 18 | 200FP 50 | Copolymer (1) 50 | ODA 0.1 | Isocyanuric acid 0.5 | P-70B 9.5 | N1000 223 | |
| Example 19 | ↑ | ↑ | ↑ | ↑ | ↑ | ↑ | |
| Comparative Example 7 | ↑ | ↑ | ↑ | ↑ | ↑ | ↑ | |
| Comparative Example 8 | ↑ | ↑ | None | None | ↑ | ↑ | |
| Comparative Example 9 | RCPO1 | ↑ | None | None | ↑ | ↑ | |
| Comparative Example 10 | None | ↑ | None | None | None | ↑ | |
| Comparative Example 11 | None | Copolymer (2) 50 | None | None | None | ↑ | |
| Comparative Example 12 | 200FP 50 | None | ODA 0.1 | ICA 0.5 | P70B 9.5 | ↑ | |
| Comparative Example 13 | None | Copolymer (1) 50 | ↑ | ↑ | ↑ | ↑ | |
| Comparative Example 14 | None | None | None | None | None | N1000 | |
| Comparative Example 15 | None | None | None | None | None | SA1203 | |

TABLE 1-continued

| No. | Melt kneading method (-), [-], <->: melt kneading | Spiral flow (mm) | Flexural modulus (Kg/cm³) | Tensile Properties YS (Kg/cm²) | Tensile Properties UE (%) | Izod impact strength (V notch) -30° C. (Kg · cm/cm) | Izod impact strength (V notch) 23° C. (Kg · cm/cm) | FWI -30° C. Kg · cm | HDT ° C. |
|---|---|---|---|---|---|---|---|---|---|
| Example 1 | <[(A + B + R) + (C + D)] + E> | 592 | 16700 | 350 | 150 | 10 | 100 | 606 | 160 |
| Example 2 | [(A + B + R + C + D) + E] | 597 | 16800 | 370 | 130 | 9 | 88 | 615 | 163 |
| Example 3 | <[(A + B + R + C) + D] + E> | 602 | 16700 | 380 | 120 | 10 | 89 | 609 | 161 |
| Example 4 | [(A + B + R + C) + E + F] | 614 | 16400 | 360 | 130 | 9 | 90 | 592 | 159 |
| Comparative Example 1 | (A + B + R + C + D + E) Simultaneous melt kneading | 410 | 16000 | 360 | 150 | 9 | 88 | 580 | 162 |
| Example 5 | [(A + B + R + C) + E] | 555 | 16700 | 380 | 120 | 7 | 64 | 417 | 171 |
| Comparative Example 2 | (A + B + R + C + E) Simultaneaus melt kneading | 356 | 17100 | 370 | 130 | 7 | 64 | 405 | 169 |
| Example 6 | [(A + B + R + C + D) + E] | 622 | 16800 | 340 | 70 | 8 | 77 | 632 | 141 |
| Example 7 | <[(A + B + R) + (C + D)] + E> | 608 | 16500 | 330 | 80 | 8 | 79 | 628 | 136 |
| Comparative Example 3 | (A + B + R + C + E) Simultaneous melt kneading | 385 | 16100 | 330 | 80 | 7 | 75 | 548 | 158 |
| Example 8 | <[(A + B + R) + (C + D)] + E> | 730 | 18300 | 390 | 80 | 9 | 78 | 560 | 121 |
| Comparative Example 4 | (A + B + R + C + D + E) Simultaneous melt kneading | 459 | 16800 | 380 | 110 | 7 | 43 | 433 | 115 |
| Example 9 | <[(A + B + R) + (C + D)] + E> | 621 | 19500 | 420 | 60 | 7 | 45 | 586 | 70 |
| Comparative Example 5 | (A + B + R + C + D + E) Simultaneous melt kneading | 470 | 20100 | 400 | 90 | 8 | 41 | 563 | 169 |
| Example 10 | <[(A + B + R) + (C + D)] + E> | 580 | 14800 | 360 | 150 | 11 | 103 | 631 | 151 |
| Comparative Example 6 | (A + B + R + C + D + E) Simultaneous melt kneading | 293 | 14900 | 330 | 160 | 10 | 94 | 620 | 149 |
| Example 11 | <[(A + B + R) + (C + D)] + E> | 591 | 16800 | 380 | 120 | 11 | 100 | 637 | 165 |
| Example 12 | ↑ | 605 | 16600 | 349 | 100 | 9 | 90 | 609 | 160 |
| Example 13 | ↑ | 588 | 17400 | 400 | 65 | 6 | 71 | 556 | 161 |
| Example 14 | ↑ | 602 | 16300 | 330 | 120 | 10 | 92 | 621 | 165 |
| Example 15 | <[(A + B) + C + D] + E> | 572 | 17200 | 400 | 90 | 9 | 92 | 600 | 169 |
| Example 16 | <[(A + B) + (C + D)] + E> | 603 | 16700 | 370 | 100 | 9 | 100 | 616 | 161 |
| Example 17 | ↑ | 599 | 16600 | 380 | 110 | 10 | 85 | 591 | 158 |
| Example 18 | <[(A + B + R) + (C + D)] + E> | 601 | 16800 | 380 | 170 | 9 | 103 | 622 | 162 |
| Example 19 | ↑ | 578 | 16700 | 370 | 110 | 10 | 91 | 612 | 160 |
| Comparative Example 7 | [A + B + R + E) + (C + D)] | 366 | 17200 | 390 | 120 | 5 | 81 | 572 | 168 |
| Comparative Example 8 | <[(A + B) + D] + E> | 358 | 17000 | 390 | 140 | 5 | 63 | 563 | 169 |
| Comparative Example 9 | ↑ | 340 | 17000 | 340 | 70 | 4 | 43 | 621 | 158 |
| Comparative Example 10 | (B + E) | 353 | 17100 | 370 | 150 | 6 | 54 | 441 | 171 |
| Comparative Example 11 | (B + E) | 348 | 16800 | 350 | 100 | 8 | 60 | 575 | 172 |
| Comparative Example 12 | [(A + R + C + D) + E] | 681 | 23500 | 480 | 30 | 5 | 12 | 450 | 179 |
| Comparative Example 13 | [(B + R + C + D) + E] | 567 | 18200 | 390 | 120 | 5 | 31 | 427 | 171 |
| Comparative Example 14 | None | 610 | 20700 | 845 | 35 | 4 | 4 | 538 | 176 |
| Comparative Example 15 | None | Molding was impossible (Distortion was conspicuous) | | | | | | | |

5. Results of Observation Under Electron Microscope

Figure 1:
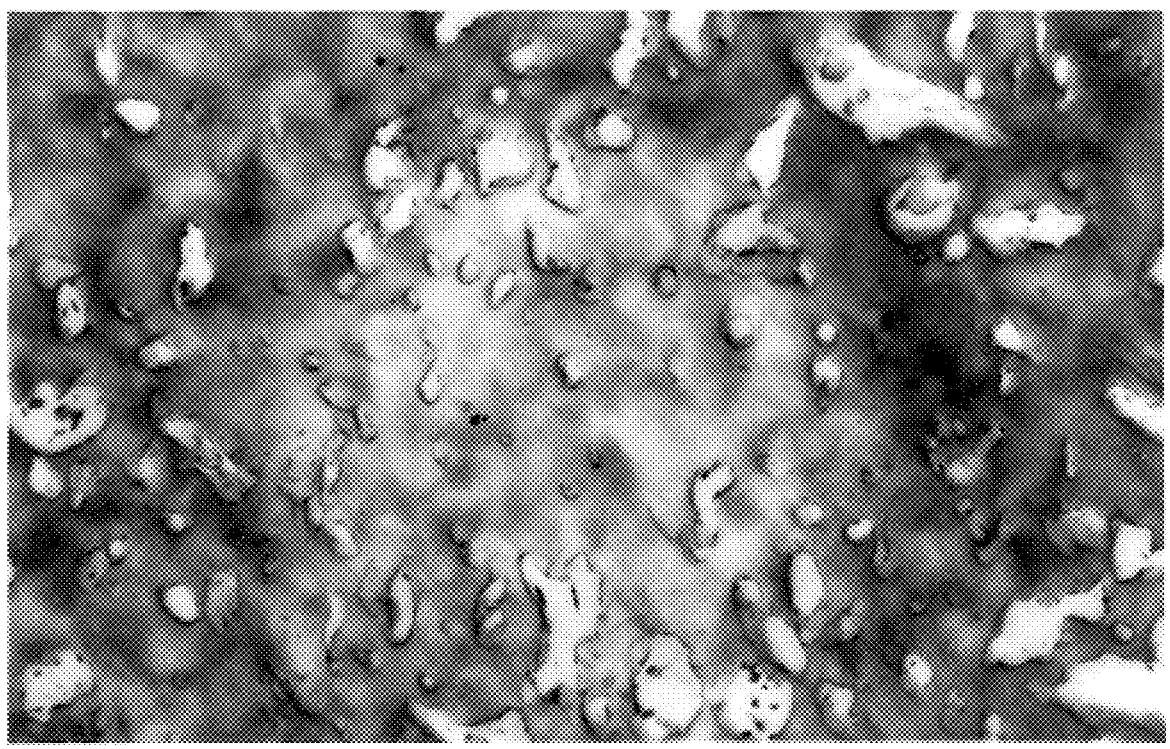
FIG. 1 shows a transmittance electron microscope photograph of ultra-thin test piece obtained from the composition of Example 1.
Figure 2:
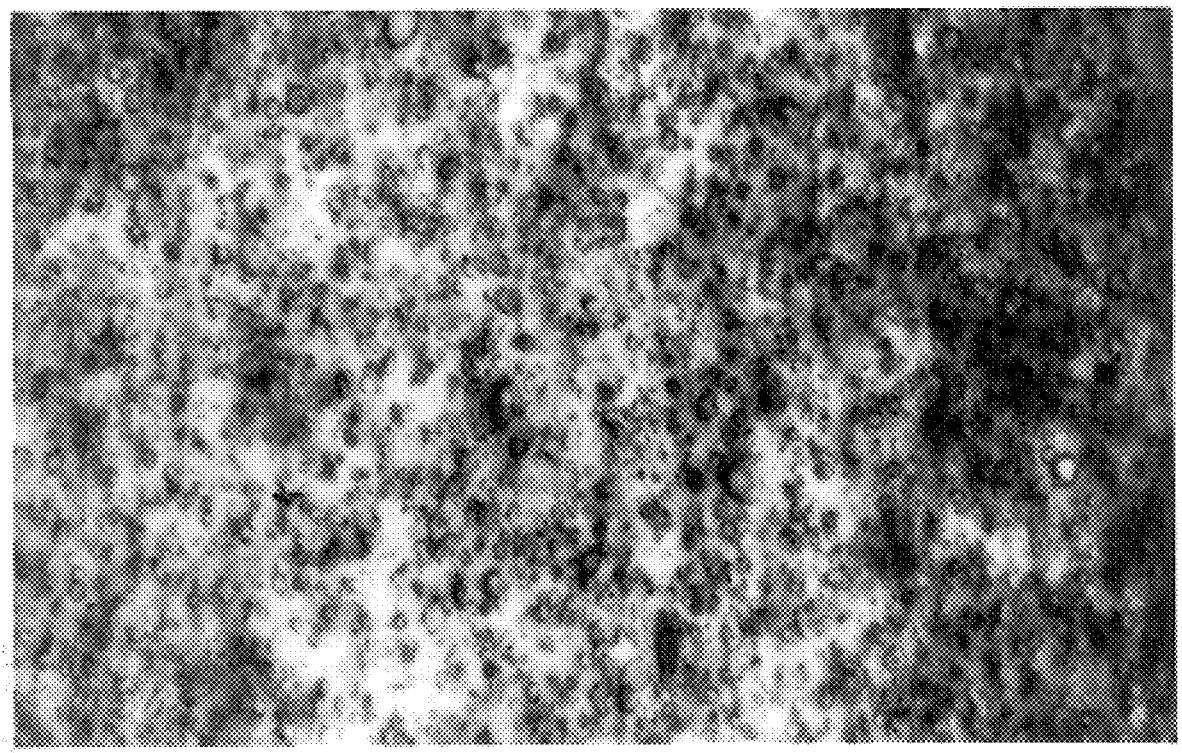
FIG. 2 shows a transmittance electron microscope photograph of ultra-thin piece obtained from the composition of Comparative Example 1.

FIG. 1 shows that diameter of dispersed particles of epoxy group-containing ethylene copolymer (B) is relatively large while FIG. 2 shows that they are fine particles. Furthermore, it is seen in FIG. 1 that block copolyether ester elastomer (D) is present in the form of membrane at interface of epoxy group-containing ethylene copolymer (B) particles and saturated polyester resins (A) and (E). It is further seen in FIG. 1 that saturated polyester resins (A) and (E) are further dispersed in the form of salami in epoxy group-containing ethylene copolymer (B) dispersed particles.

The polyester resin composition obtained by the method of the present invention is superior in balancing of mechanical properties such as impact resistance and thermal properties and is further superior in flow processability.

It is unexpectable improving effect that processability can be markedly improved by carrying out melt kneading by a specific two-stage blending method.

Moreover, the impact resistant polyester resin composition provided by present invention can be easily molded into shaped articles, films, sheets, etc. by moliding methods employed for usual saturated polyester resin compositions such as injection molding and extrusion molding and the molded products are excellent in balancing of properties such as impact resistance, rigidity and heat resistance and uniformity and smoothness of appearance.

What we claim is:

1. A method for producing a saturated polyester resin composition (II) having excellent impact resistance which comprises melt kneading a mixture of 100 parts by weight of (A) and (B), wherein (A) comprises 30–58 parts by weight of a saturated polyester resin and (B) comprises 42–70 parts by weight of an epoxy group-containing ethylene copolymer comprising (a) 50–99% by weight of an ethylene unit, (b) 0.1–30% by weight of an unsaturated carboxylic acid glycidyl ester unit or an unsaturated glycidyl ether unit, and (c) 0–49% by weight of an ethylenically unsaturated ester compound unit, and being prepared by copolymerizing (a), (b) and (c) in the presence of a radical former under 500–4000 atm at 100–300° C., with (C) 0.01–20 parts by weight of a polyfunctional compound containing at least two identical or different functional groups selected from the group consisting of amino group, carboxyl group, carboxylic acid anhydride group, hydroxyl group and

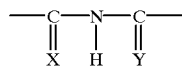

unit wherein X and Y are both oxygen atoms or sulfur atoms or one of them is an oxygen atom and another is a sulfur atom and (D) 0–30 parts by weight of a block copolyether ester elastomer comprising an alkylene terephthalate unit and an poly(alkylene oxide) glycol unit having a number-average molecular weight of 400–6000 to obtain a former-stage composition (1); and furthermore melt kneading the resulting composition at a later stage with (E) 50–1000 parts by weight of a saturated polyester resin and (F) 0–30 parts by weight of a block copolyether ester elastomer comprising an alkylene terephthalate unit and an poly(alkylene oxide) glycol unit having a number-average molecular weight of 400–6000, wherein the total amount of components (D) and (F) is greater than 0 parts.

2. A method for producing the impact-resistant polyester resin composition (II) according to claim (1), wherein the polyfunctional compound of the component (C) is an aliphatic diamine carbamate.

3. A method for producing the impact-resistant polyester resin composition (II) according to claim (1), wherein the polyfunctional compound of the component (C) is an ethylene copolymer comprising ethylene unit and α, β-unsaturated carboxylic acid N,N-dialkylaminoalkyl ester unit, or ethylene unit and α, β-unsaturated carboxylic acid N,N-dialkylaminoalkylamide.

4. A method for producing the impact-resistant polyester resin composition according to claim (1), wherein the polyfunctional compound of the component (C) is an ethylene copolymer comprising ethylene unit, a, 3-unsaturated carboxylic acid alkyl ester unit and maleic anhydride unit.

5. A method for producing the impact-resistant polyester resin composition (II) according to claim (1), wherein the compound having

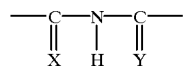

unit of the polyfunctional compound of the component (C) is a heterocyclic ring compound.

6. A method for producing the impact-resistant polyester resin composition (II) according to claim (1), wherein the polyfunctional compound of the component (C) is a dicarboxylic acid.

7. A method for producing the impact-resistant polyester resin composition (II) according to claim (1), wherein the polyfunctional compound of the component (C) is an ethylene copolymer comprising ethylene unit and α, β-unsaturated carboxylic acid unit or an ethylene copolymer comprising unsaturated carboxylic acid alkyl ester unit in addition to the two units above.

8. A method for producing the impact-resistant polyester resin composition (II) according to claim (1), wherein the polyfunctional compound of the component (C) comprises carboxyl group and amino group.

* * * * *